(12) United States Patent
Watanabe

(10) Patent No.: US 7,280,766 B2
(45) Date of Patent: Oct. 9, 2007

(54) METHOD AND DEVICE FOR PROCESSING AN OPTICAL SIGNAL

(75) Inventor: Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 699 days.

(21) Appl. No.: 10/602,623

(22) Filed: Jun. 25, 2003

(65) Prior Publication Data

US 2004/0005153 A1 Jan. 8, 2004

(30) Foreign Application Priority Data

Jul. 5, 2002 (JP) ............................. 2002-197538

(51) Int. Cl.
*H04B 10/02* (2006.01)

(52) U.S. Cl. .................... 398/180; 398/147; 398/175

(58) Field of Classification Search ................ 398/175, 398/176, 147, 148, 149, 150, 178, 179, 180
See application file for complete search history.

(56) References Cited

U.S. PATENT DOCUMENTS

| 5,539,563 | A | * | 7/1996 | Park ............................ 398/148 |
| 5,943,151 | A | * | 8/1999 | Grasso et al. ................ 398/147 |
| 6,141,129 | A | * | 10/2000 | Mamyshev .................. 398/180 |
| 6,424,773 | B1 | | 7/2002 | Watanabe |
| 6,498,669 | B1 | * | 12/2002 | Payne et al. ................. 398/147 |
| 6,509,993 | B1 | * | 1/2003 | Gnauck et al. .............. 398/194 |
| 2001/0013965 | A1 | * | 8/2001 | Watanabe .................... 359/161 |

FOREIGN PATENT DOCUMENTS

| EP | 1056173 | A2 | * | 11/2000 |
| JP | 2000-010129 | A | | 1/2000 |
| JP | 2000-321606 | A | | 11/2000 |
| JP | 2000-323786 | A | | 11/2000 |
| JP | 2001-069080 | A | | 3/2001 |
| JP | 2001-117125 | A | | 4/2001 |
| JP | 2001-222037 | A | | 8/2001 |
| JP | 2001-249371 | A | | 9/2001 |
| JP | 2002-023208 | A | | 1/2002 |
| JP | 2002-077052 | A | | 3/2002 |

OTHER PUBLICATIONS

Sakamoto et al., All optical wavelengths conversion of 500-fs pulse trains by using a nonlinear optical loop mirror composed of a highly nonlinear DSF, May 2001, IEEE Photonics technology letters, vol. 13, No. 5.*

Tatham et al., Transmission of 10Gbit/s directly modulated DFB signals over 200km standard fibre using mid-spand spectral inversion, Aug. 1994, IEE Electronics Letters, vol. 30, No. 16.*

* cited by examiner

Primary Examiner—Christina Leung
(74) Attorney, Agent, or Firm—Staas & Halsey LLP

(57) ABSTRACT

The present invention is a method of processing an optical signal, including the steps of (a) inputting signal light into a first nonlinear optical medium to broaden the spectrum of the signal light through self phase modulation occurring in the first nonlinear optical medium, thereby obtaining first spectrally broadened light, (b) compensating for chromatic dispersion effected on the first spectrally broadened light obtained in the step (a), and (c) inputting the first spectrally broadened light processed by the step (b) into a second nonlinear optical medium to broaden the spectrum of the first spectrally broadened light through self phase modulation occurring in the second nonlinear optical medium, thereby obtaining second spectrally broadened light.

29 Claims, 8 Drawing Sheets

METHOD AND DEVICE FOR PROCESSING AN OPTICAL SIGNAL

BACKGROUND OF THE INVENTION

1. Field of the Invention

The present invention relates to a method and device for processing an optical signal.

2. Description of the Related Art

By inputting an optical pulse having a high power level into a nonlinear optical medium such as an optical fiber, spectrally broadened light called supercontinuum (SC) light can be generated. The application of SC light to a multi-wavelength light source has been actively examined in the prior art, and any other applications of SC light to multi-wavelength optical clock regeneration, wavelength conversion, distribution, etc. are also possible.

Optical clock pulses having repetition time to or a data-modulated optical pulse train are/is input into an optical fiber to generate SC light. In this case, SC light having a band spectrum configured by continuous-wave (CW) light having a frequency spacing $f=1/t_0$ is generated. By extracting each CW light in the SC light by using a narrow-band optical bandpass filter, a multiwavelength CW light source can be configured. Further, by using an optical bandpass filter capable of passing a plurality of CW lights, multiwavelength optical clock pulses having repetition time to can be generated. In the case of inputting a data-modulated optical pulse train into an optical fiber to generate SC light, wavelength-converted light of data signal light, for example, can be generated by using an optical bandpass filter. The pulse width of the optical clock or wavelength-converted light generated can be controlled according to the passband of the optical bandpass filter used.

An optical fiber having a length required for generation of necessary third-order nonlinear effects is used for the generation of SC light in the prior art. To broaden the spectrum as greatly as possible, a fiber having a small anomalous dispersion or a dispersion flattened fiber, for example, is used. To broaden the spectrum and ensure a sufficient signal-to-noise ratio (S/N ratio), a fiber having a small normal dispersion, for example, is used.

SC light is generated by using self phase modulation (SPM) in an optical fiber as a nonlinear optical medium. Accordingly, a short pulse having a steep slope is suitable for the optical pulse as the SC light. However, the effect of dispersion becomes more remarkable with a decrease in pulse width, and it is therefore difficult to maintain an optimum pulse shape over the length of the optical fiber for generating the SC light. As a result, there is a limit to the fiber length allowing the generation of the SC light, causing a limit to a spectral broadening rate.

Known as a method of maintaining a pulse shape in an optical fiber is a method of using a dispersion decreasing fiber (DDF) such that dispersion is decreased in an anomalous dispersion region in accordance with attenuation of power. However, the design and manufacture of this fiber are difficult, and the optical power must be maintained at a specific value, so that this method is difficult to be practical.

A more practical generating method for SC light is to use an optical fiber having normal dispersion. In this case, the sign of chirp induced by SPM is reversed at the opposite edges of an optical pulse, so that the pulse is rectangularly changed by dispersion and the spectrum is also rectangularly broadened. Accordingly, the S/N ratio can be maintained good. However, the spectral broadening rate is limited as compared with the case of using an anomalous dispersion fiber. Consequently, it is desirable to achieve an SC light generating method which can maintain the S/N ratio by using a normal dispersion fiber and can enlarge the spectral broadening rate.

SUMMARY OF THE INVENTION

It is therefore an object of the present invention to provide an optical signal processing method and device suitable for generation of SC light which can obtain a high S/N ratio and a large spectral broadening rate.

Other objects of the present invention will become apparent from the following description.

In accordance with a first aspect of the present invention, there is provided a method of processing an optical signal, including the steps of (a) inputting signal light into a first nonlinear optical medium to broaden the spectrum of the signal light through self phase modulation occurring in the first nonlinear optical medium, thereby obtaining first spectrally broadened light; (b) compensating for chromatic dispersion effected on the first spectrally broadened light obtained in the step (a); and (c) inputting the first spectrally broadened light processed by the step (b) into a second nonlinear optical medium to broaden the spectrum of the first spectrally broadened light through self phase modulation occurring in the second nonlinear optical medium, thereby obtaining second spectrally broadened light.

In accordance with a second aspect of the present invention, there is provided a device for processing an optical signal, including a first nonlinear optical medium for inputting signal light to broaden the spectrum of the signal light through self phase modulation occurring in the first nonlinear optical medium, thereby obtaining first spectrally broadened light; a dispersion compensator for compensating for chromatic dispersion effected on the first spectrally broadened light obtained by the first nonlinear optical medium; and a second nonlinear optical medium for inputting the first spectrally broadened light processed by the dispersion compensator to broaden the spectrum of the first spectrally broadened light through self phase modulation occurring in the second nonlinear optical medium, thereby obtaining second spectrally broadened light.

In accordance with a third aspect of the present invention, there is provided a system including an optical coupler for splitting signal light into first and second signal lights; an optical clock regenerator for generating clock pulses according to the first signal light; an optical AND circuit for inputting the clock pulses and the second signal light to output converted signal light obtained by synchronization of the clock pulses and the second signal light; and an optical signal processing device for inputting the converted signal light output from the optical AND circuit. The optical signal processing device includes a first nonlinear optical medium for inputting the converted signal light to broaden the spectrum of the converted signal light through self phase modulation occurring in the first nonlinear optical medium, thereby obtaining first spectrally broadened light; a dispersion compensator for compensating for chromatic dispersion effected on the first spectrally broadened light obtained by the first nonlinear optical medium; a second nonlinear optical medium for inputting the first spectrally broadened light processed by the dispersion compensator to broaden the spectrum of the first spectrally broadened light through self phase modulation occurring in the second nonlinear optical medium, thereby obtaining second spectrally broadened light; and an optical bandpass filter for inputting the second spectrally broadened light, having a passband whose center wavelength is different from the center wavelength of the second spectrally broadened light, thereby obtaining a signal component of the inputted light.

In accordance with a fourth aspect of the present invention, there is provided a system including a first optical fiber transmission line for transmitting signal light; an optical signal processing device for inputting the signal light transmitted by the first optical fiber transmission line; and a second optical fiber transmission line for transmitting regenerated light output from the optical signal processing device. The optical signal processing device includes a first nonlinear optical medium for inputting the signal light to broaden the spectrum of the signal light through self phase modulation occurring in the first nonlinear optical medium, thereby obtaining first spectrally broadened light; a dispersion compensator for compensating for chromatic dispersion effected on the first spectrally broadened light obtained by the first nonlinear optical medium; and a second nonlinear optical medium for inputting the first spectrally broadened light processed by the dispersion compensator to broaden the spectrum of the first spectrally broadened light through self phase modulation occurring in the second nonlinear optical medium, thereby obtaining second spectrally broadened light.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1:
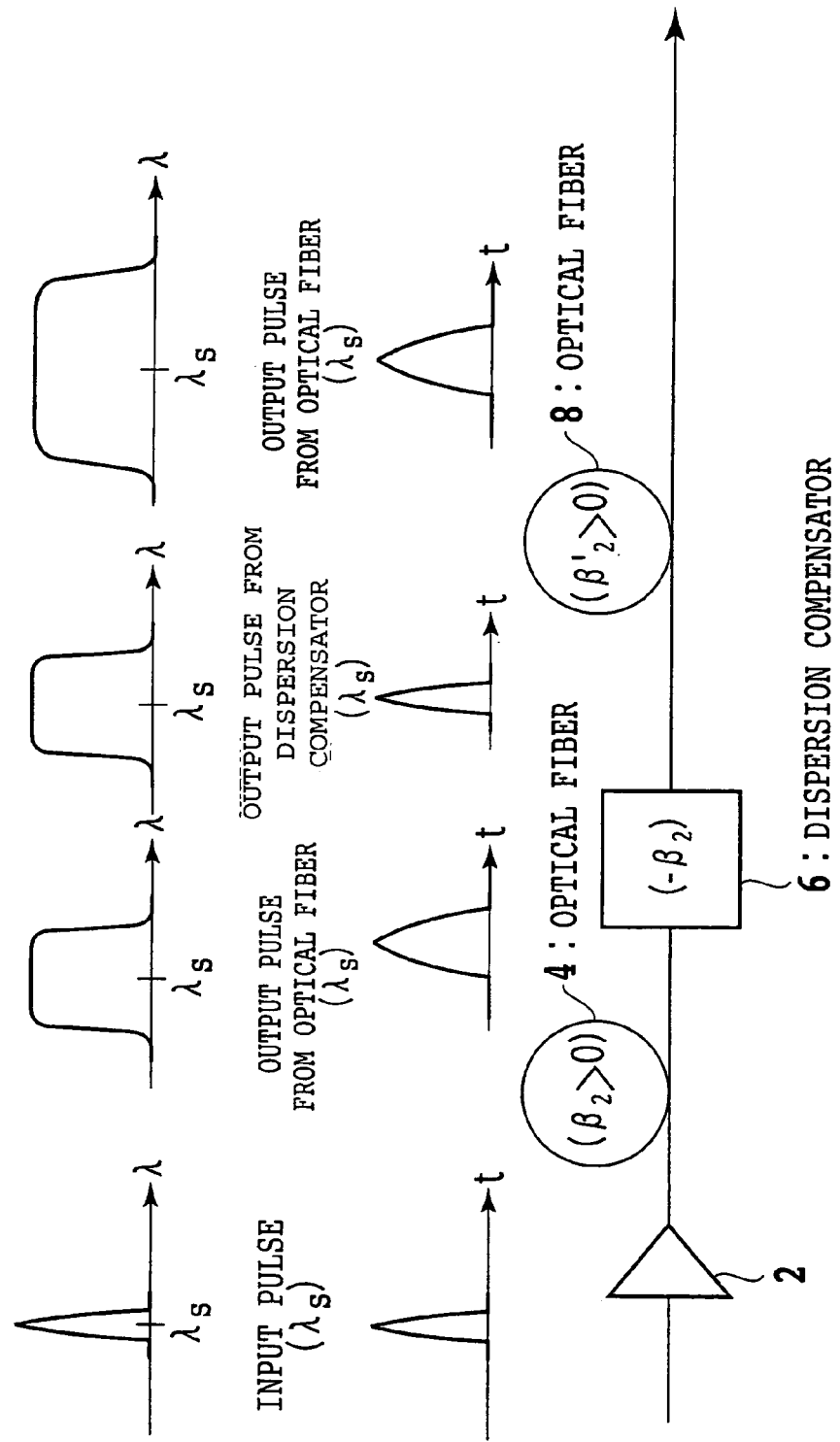
FIG. 1 is a block diagram showing a first preferred embodiment of the device according to the present invention.

Some preferred embodiments of the present invention will now be described in detail with reference to the attached drawings. Throughout the drawings, substantially the same or like parts are denoted by the same reference numerals.

FIG. 1 is a block diagram showing a first preferred embodiment of the device according to the present invention. Signal light (input pulse) having a wavelength $\lambda_s$ input into this device is first amplified by an optical amplifier 2 to obtain a suitable power, and next input into an optical fiber 4 as a first nonlinear optical medium. The optical fiber 4 has normal dispersion ($\beta_2 > 0$) in this preferred embodiment, and this chromatic dispersion causes a change in pulse shape of the signal light in the optical fiber 4. More specifically, the pulse width is increased along a time axis. Simultaneously, the spectrum of the signal light is broadened along a wavelength axis through self phase modulation (SPM) in the optical fiber 4.

Signal light output from the optical fiber 4 in which the pulse shape and the spectral shape have been changed is next input into a dispersion compensator 6, in which anomalous dispersion (e.g., $-\beta_2$) opposite in sign to the dispersion of the optical fiber 4 is given to the signal light. As a result, the pulse shape is almost restored to the original pulse shape with the spectral shape unchanged.

The dispersion compensator 6 may be provided by a dispersion compensating fiber, a fiber grating, etc. While the dispersion compensator 6 is arranged downstream of the optical fiber 4, the dispersion compensator 6 may be arranged between the optical fiber 4 and the optical amplifier 2 or upstream of the optical amplifier 2.

Signal light output from the dispersion compensator 6 in which the pulse shape has been restored to the original pulse shape is next input into an optical fiber 8 as a second nonlinear optical medium. The optical fiber 8 has normal dispersion ($\beta_2' > 0$) as in the optical fiber 4. In the optical fiber 8, chirping of the signal light is generated to broaden the spectrum to a desired width.

According to this preferred embodiment, the dispersion compensator 6 is used to once restore the pulse shape to the original pulse shape, and the two nonlinear optical media (the optical fibers 4 and 8) are used to broaden the spectrum. By the combination of these processing steps, the spectral broadening rate can be effectively increased as compared with the case of broadening the spectrum by using only the two nonlinear optical media.

The reason for providing the optical amplifier 2 is to sufficiently increase the power of the signal light to be input into the optical fiber 4 and thereby to obtain required nonlinear effects (e.g., third-order nonlinear effects) in the optical fiber 4.

Figure 2:
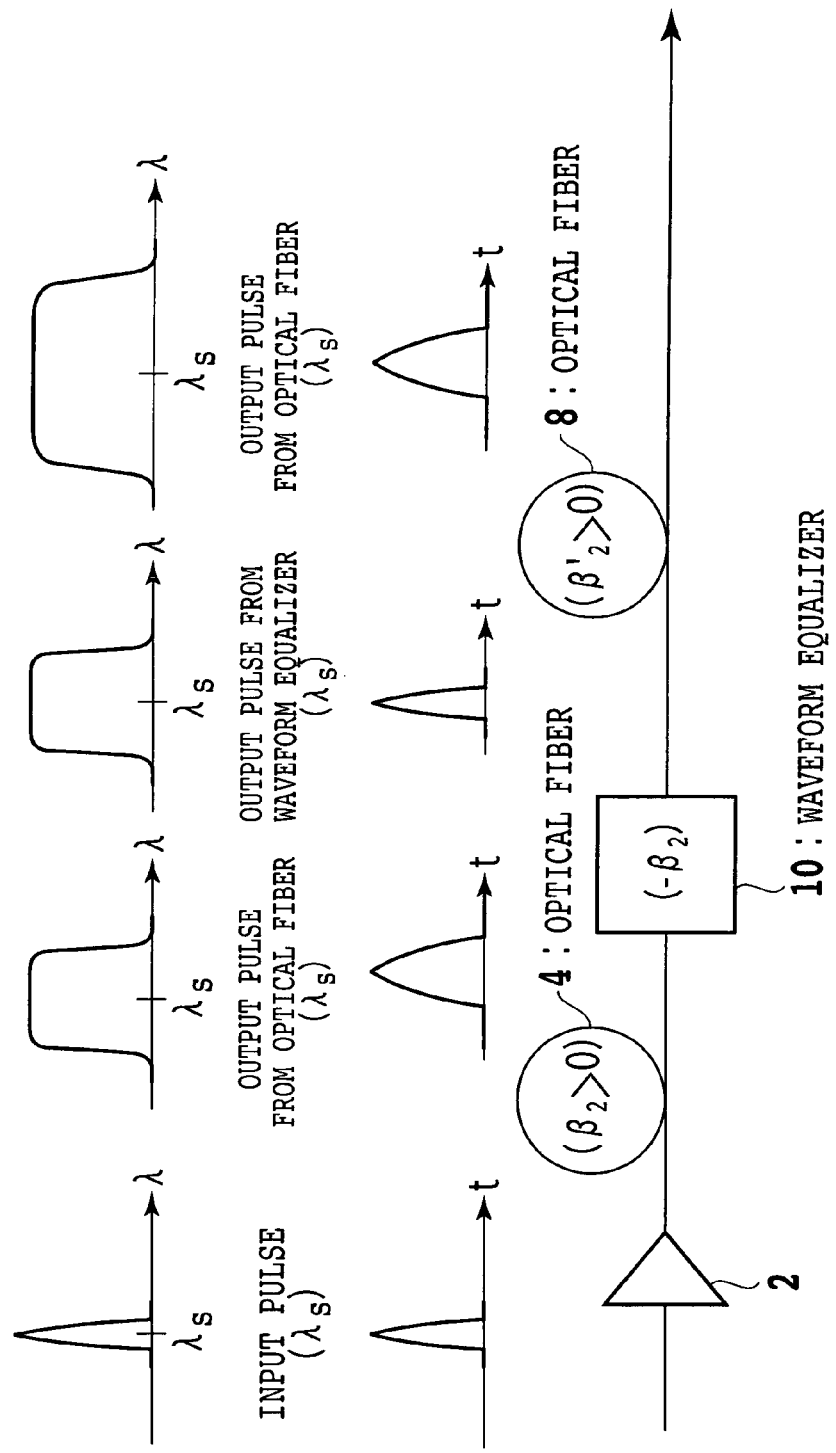
FIG. 2 is a block diagram showing a second preferred embodiment of the device according to the present invention.

FIG. 2 is a block diagram showing a second preferred embodiment of the device according to the present invention. In this preferred embodiment, a waveform equalizer 10 is used in place of the dispersion compensator 6 shown in FIG. 1. In the case that waveform distortion due to chromatic dispersion and the nonlinear optical effects are not negligible in the optical fiber 4, the waveform equalizer 10 functions to remove such waveform distortion. Accordingly, large nonlinear optical effects can be obtained to generate chirping of the signal light in the optical fiber 8, thereby effectively broadening the spectrum.

For effective generation of the SPM-induced chirp, it is effective to use a dispersion flattened fiber (DFF) providing a small normal dispersion independent of wavelength or to increase the third-order nonlinear coefficient γ of an optical fiber. The DFF can be obtained by suitably controlling a core diameter or a relative refractive-index difference, for example. On the other hand, the third-order nonlinear coefficient $\gamma$ of an optical fiber is expressed as follows:

$$\gamma = \omega n_2 / c A_{\text{eff}}$$

where $\omega$ is the optical angular frequency, c is the velocity of light in a vacuum, and n2 and $A_{\text{eff}}$ are the nonlinear refractive index and the effective core area of the optical fiber, respectively. The nonlinear coefficient $\gamma$ of a conventional DSF (dispersion shifted fiber) is as small as about 2.6 $W^{-1}$ $km^{-1}$, so a fiber length of several km to 10 km or more is necessary to obtain sufficient chirping. For generation of a sufficiently large chirp with a shorter DSF, it is effective to increase $\gamma$ by increasing the nonlinear refractive index $n_2$ in the above equation or increase a light intensity by reducing a mode field diameter (MFD) corresponding to the effective core area $A_{\text{eff}}$ in the above equation. The nonlinear refractive index $n_2$ can be increased by doping the cladding with fluorine or the like or by doping the core with a high concentration of $GeO_2$, for example. By doping the core with 25 to 30 mol % of $GeO_2$, a large value of $5 \times 10^{-20}$ $m^2/W$ or more (about $3.2 \times 10^{-20}$ $m^2/W$ for a usual silica fiber) can be obtained as the nonlinear refractive index $n_2$. On the other hand, the MFD can be reduced by designing a relative refractive-index difference $\Delta$ between the core and the cladding or by designing the core shape. For example, by doping the core with 25 to 30 mol % of $GeO_2$ and setting the relative refractive-index difference $\Delta$ to 2.5 to 3.0%, a small value of about 4 μm can be obtained as the MFD. Owing to the combined effects of increasing the nonlinear refractive index $n_2$ and reducing the MFD, an optical fiber having a large value of 15 $W^{-1}$ $km^{-1}$ or more as the nonlinear coefficient $\gamma$ can be obtained.

Further, to sufficiently increase a dispersion length over a nonlinear length or to effect chirp compensation, it is desirable that the GVD of such a fiber can be arbitrarily adjusted. This point can also be satisfied by setting each parameter in the following manner. That is, in general, a dispersion in a usual DCF increases in a normal dispersion region with an increase in refractive index difference $\Delta$ under the condition that the MFD is set constant. On the other hand, the dispersion decreases with an increase in core diameter, whereas the dispersion increases with a decrease in core diameter. Accordingly, the dispersion can be reduced to zero by increasing the core diameter under the condition that the MFD is set to a certain value in a wavelength band used. Conversely, a desired normal dispersion fiber can also be obtained.

A highly nonlinear dispersion shifted fiber (HNL-DSF) or dispersion compensating fiber (DCF) having a large value of 15 $W^{-1}$ $km^{-1}$ or more for the nonlinear coefficient $\gamma$ has been realized by the above method. For example, the fiber having a nonlinear coefficient $\gamma$ of 15 $W^{-1}$ $km^{-1}$ can achieve the same conversion efficiency as that by a usual DSF even when the fiber length is reduced to about 2.6/15 ~1/5.7 as compared with the usual DSF. As mentioned above, the usual DSF requires a length of about 10 km for sufficient conversion efficiency. To the contrary, the HNL-DSF having a large nonlinear coefficient $\gamma$ as mentioned above can obtain a similar effect with a reduced length of about 1 to 2 km. Practically, loss in the fiber is reduced in an amount corresponding to a decrease in fiber length, so that the fiber can be further shortened to obtain the same efficiency.

As the optical fiber for each nonlinear optical medium, not only a highly nonlinear fiber as obtained above, but also a photonic crystal fiber (Holey fiber) is suitable.

Figure 3:
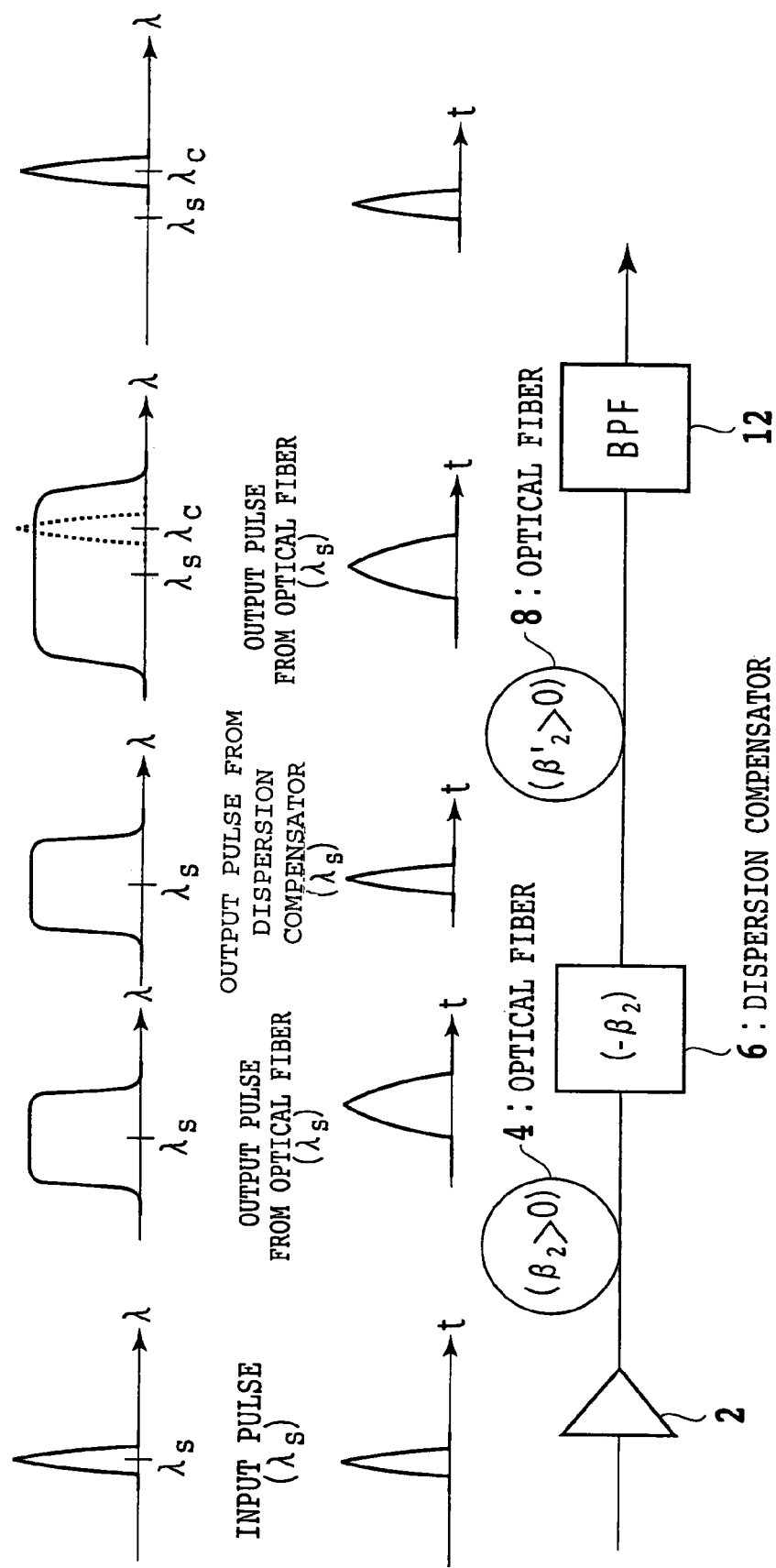
FIG. 3 is a block diagram showing a third preferred embodiment of the device according to the present invention.

FIG. 3 is a block diagram showing a third preferred embodiment of the device according to the present invention. In this preferred embodiment, an optical bandpass fiber (BPF) 12 for inputting spectrally broadened signal light output from the optical fiber 8 is additionally provided. The optical bandpass fiber 12 has a passband narrower than the spectral width broadened by the optical fiber 8. The center wavelength $\lambda_c$ in the passband of the optical bandpass fiber 12 is set different from the center wavelength $\lambda_s$ of the signal light. The principle of noise suppression or the like obtained by the use of the optical bandpass filter 12 will now be described.

When an optical pulse is input into a nonlinear optical medium, chirping is induced by SPM in the nonlinear optical medium to thereby broaden the spectrum of the optical pulse. As shown in an upper portion of FIG. 3 (similarly in FIGS. 1 and 2), it is understood that the spectrum of signal light having a center wavelength $\lambda_s$ is broadened with respect to the center wavelength $\lambda_s$ by passing the signal light through the optical fibers 4 and 8. In the range of this broadened spectrum, a signal component is extracted by the optical bandpass filter 12 having a passband whose center wavelength $\lambda_c$ is different from the wavelength $\lambda_s$.

Even in the case that the amplitudes of the pulses of the signal light which should be normally constant are different from each other because of distortion by transmission or the like (amplitude fluctuations or amplitude noise), the spectrum is constant in the range where chirping is generated, so that the amplitude fluctuations can be suppressed. In other words, a waveform shaping function can be obtained.

In more detail, a small-chirp component is removed in the optical bandpass filter 12. The small-chirp component mainly includes fluctuations in off-power (bit 0) component from a zero point (e.g., waveform degradation due to GVD) and a small-slope component near the peak of the pulse. These components determine an optical signal-to-noise ratio (OSNR). Accordingly, by removing these components by the use of the optical bandpass filter 12, it is possible to suppress a reduction in OSNR due to the power fluctuations, extinction ratio degradation, noise accumulation, etc. of these components. Accordingly, wavelength conversion accompanied by the improvement in OSNR can be effected by the present invention.

It is preferable to sufficiently space the center wavelength $\lambda_c$ in the passband of the optical bandpass filter 12 from the center wavelength $\lambda_s$ of the signal light so that the small-chirp component including noise is not included in the output signal pulse. It is preferable to suitably set the width and shape of the passband of the optical bandpass filter 12 according to the width and shape of a pulse required. Basically, the shape of the passband of the optical bandpass filter 12 is preferably set substantially equal to the spectral shape of an input signal pulse. This will now be discussed more specifically.

In the case that the passband of the optical bandpass filter 12 is narrow enough to extract each component of an optical carrier constituting the spectrally broadened signal light (which will be hereinafter sometimes referred to as "SC light"), CW light can be generated. On the other hand, in the case that this passband has a width covering a plurality of optical carriers, an optical pulse train synchronous with the input signal pulses can be generated. That is, wavelength-converted light of the input signal pulses can be generated. The shape and duration of each optical pulse thus generated are determined by the shape and width of the passband of the optical bandpass filter 12. Accordingly, in contrast to the preferred embodiments shown in FIGS. 1 and 2 wherein the duration of the pulse output from the optical fiber 8 is longer than that of the pulse input into the optical fiber 8, the duration of the pulse output from the optical bandpass filter 12 is not elongated from that of the pulse input into the optical fiber 8 in the preferred embodiment shown in FIG. 3 and in the preferred embodiment shown in FIG. 4 to be hereinafter described.

According to this preferred embodiment, a high-quality optical signal can be processed through a generating method for SC light which can obtain a high S/N ratio and a large spectral broadening rate.

Figure 4:
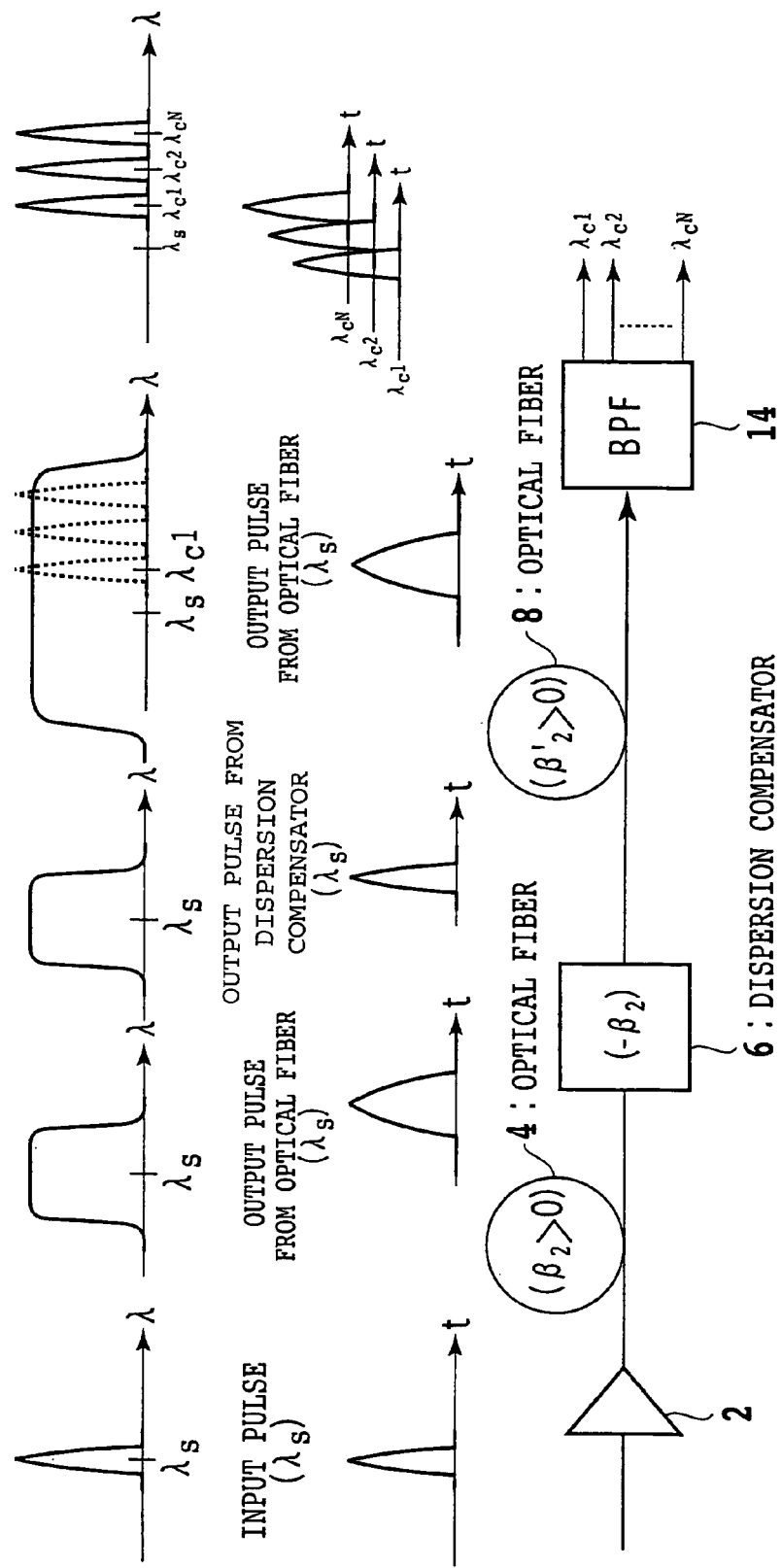
FIG. 4 is a block diagram showing a fourth preferred embodiment of the device according to the present invention.

FIG. 4 is a block diagram showing a fourth preferred embodiment of the device according to the present invention. In contrast to the preferred embodiment shown in FIG. 3 wherein the optical bandpass filter 12 having a single passband is used, the preferred embodiment shown in FIG. 4 employs an optical bandpass filter 14 having a plurality of passbands. The plurality of passbands respectively have center wavelengths $\lambda_{c1}$ to $\lambda_{cN}$, each of which is preferably different from the center wavelength $\lambda_s$ of the signal light.

The optical bandpass filter 14 may be provided by using a plurality of multilayer filters or fiber gratings. Alternatively, an arrayed waveguide grating may be used.

Also in this preferred embodiment, in the case that each passband of the optical bandpass filter 14 is narrow enough to extract each component of an optical carrier constituting the SC light, CW light can be generated. On the other hand, in the case that each passband has a width covering a plurality of optical carriers, an optical pulse train synchronous with the input signal pulses can be generated. That is, a plurality of wavelength-converted lights of the input signal pulses can be generated. The shape and duration of each optical pulse thus generated are determined by the shape and width of each passband of the optical bandpass filter 14.

Also according to this preferred embodiment, a high-quality optical signal can be processed through a generating method for SC light which can obtain a high S/N ratio and a large spectral broadening rate. Further, by using this device as a light source device, a plurality of optical carriers or optical signals having different wavelengths can be obtained on the basis of light emitted from a single light source.

Figure 5:
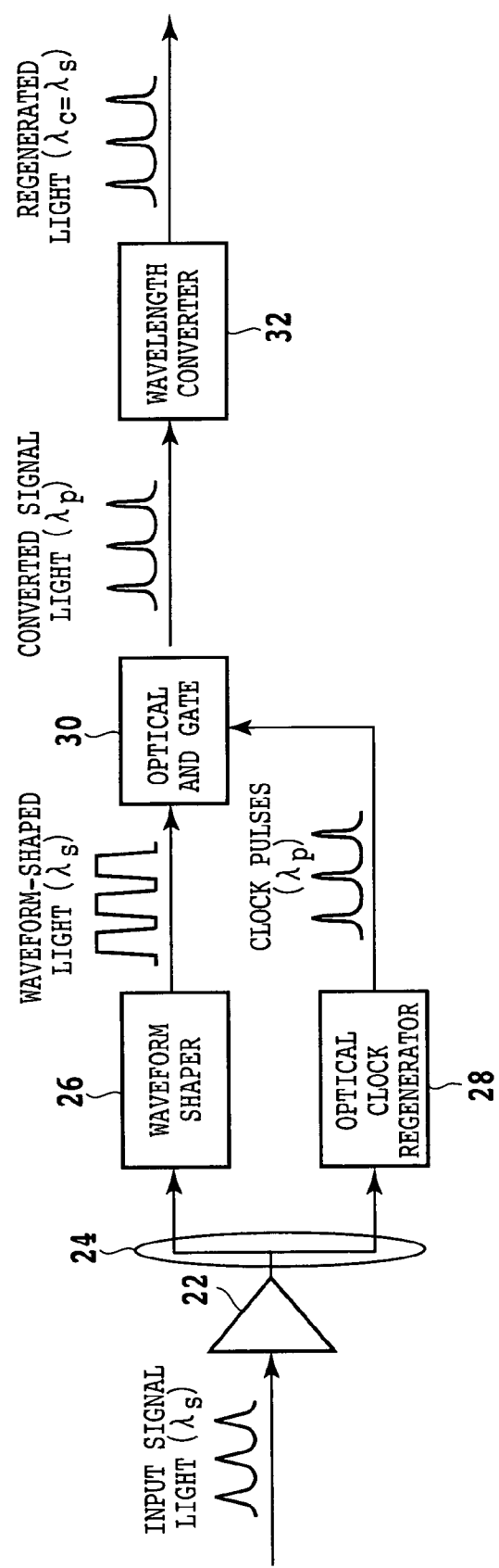
FIG. 5 is a block diagram showing a fifth preferred embodiment of the device according to the present invention.

FIG. 5 is a block diagram showing a fifth preferred embodiment of the device according to the present invention. This device includes an optical amplifier 22, an optical coupler 24, a waveform shaper 26, an optical clock regenerator 28, an optical AND gate 30, and a wavelength converter 32.

An optical signal (input signal light) having a wavelength $\lambda_s$ to be waveform shaped is amplified by the optical amplifier 22, and next split into first and second optical signals by the optical coupler 24. The first optical signal is supplied to the waveform shaper 26. In the waveform shaper 26, the pulse widths of the first optical signal are increased to obtain waveform shaped light (wavelength $\lambda_s$). The waveform shaped light thus obtained is output from the waveform shaper 26.

On the other hand, the second optical signal is supplied to the optical clock regenerator 28. In the optical clock regenerator 28, clock pulses as probe light having a wavelength $\lambda_p$ are generated according to the second optical signal. Both the waveform shaped light and the clock pulses are supplied to the optical AND gate 30. In the optical AND gate 30, a converted optical signal (converted signal light) having a wavelength $\lambda_p$ is obtained in synchronism with the time during which the waveform shaped light and the clock pulses coexist. The wavelength $\lambda_p$ of the converted signal light output from the optical AND gate 30 is converted into a wavelength $\lambda_c$ (preferably, $\lambda_c=\lambda_s$) in the wavelength converter 32 to obtain regenerated light.

The optical clock regenerator 28 serves to regenerate clock pulses having reference time intervals from signal light disordered in time intervals. For example, in the case of signal light having a speed of 160 Gb/s, a train of pulses having a frequency of 160 GHz arranged at 6.25 ps intervals is regenerated. The generation of clock pulses may be effected by first converting an optical signal into an electrical signal, next retiming the electrical signal, and next oscillating a mode-locked laser (MLL) by using the electrical RF signal. Alternatively, the MLL may be directly oscillated without opto-electric conversion.

However, in the case of a high-speed signal as of 160 Gb/s, the signal speed exceeds the limit of the operating speed in electronics, and the realization of the MLL operating at such a high speed is also difficult. Accordingly, it is preferable to regenerate a pulse train of lower speed such as 10 GHz and next generate clock pulses of 160 GHz by using OTDM (optical time division multiplexing).

Figure 6:
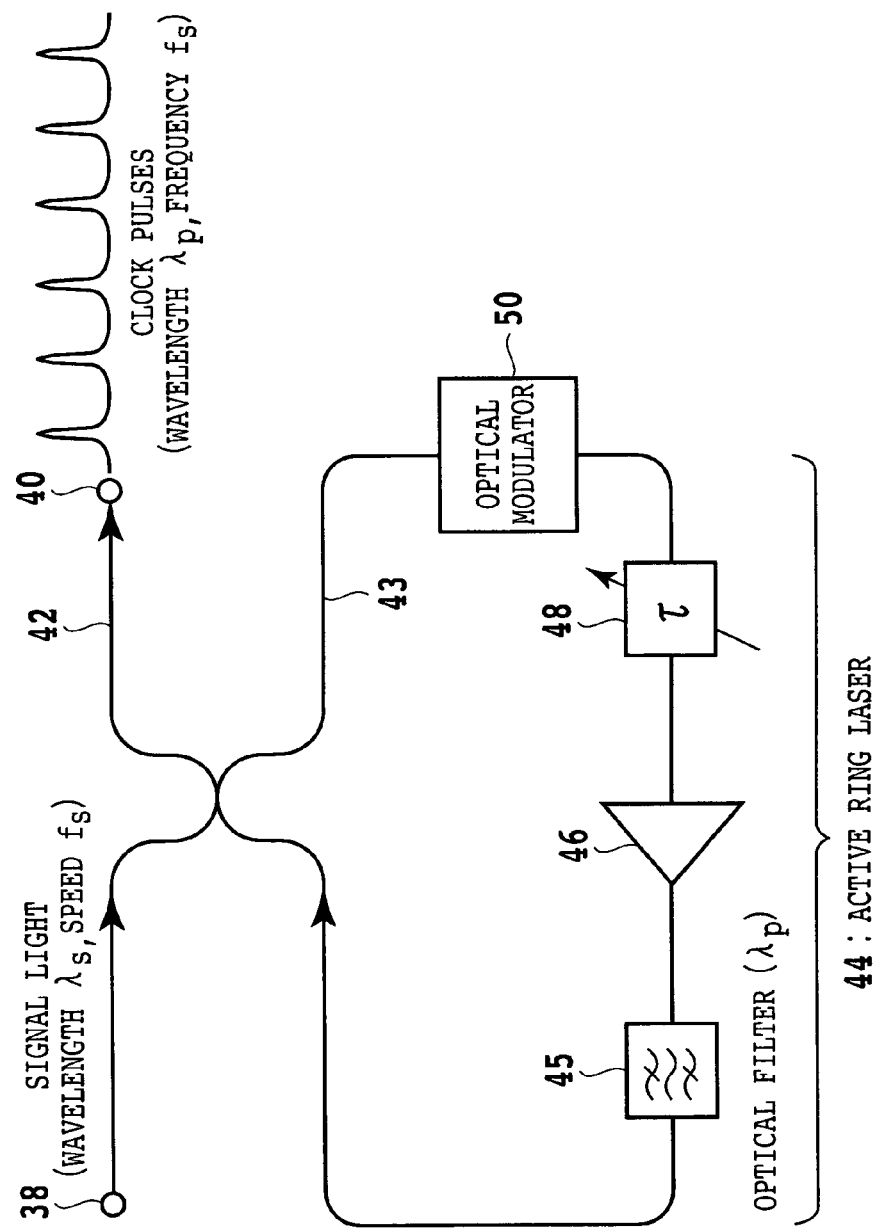
FIG. 6 is a block diagram showing a preferred embodiment of a clock regenerator applicable to the present invention.

FIG. 6 is a block diagram showing a preferred embodiment of the optical clock regenerator 28 shown in FIG. 5. This clock regenerator includes an optical path 42 provided between an input port 38 and an output port 40, and an active ring laser 44 including an optical loop 43 optically coupled (e.g., directionally coupled) to the optical path 42.

Signal light (second optical signal) having a wavelength $\lambda_s$ and a speed $f_s$ is supplied to the input port 38. The active ring laser 44 includes an optical amplifier 46 for compensating loss in the optical loop 43 so that laser oscillation occurs in the optical loop 43, an adjuster 48 for adjusting the optical path length of the optical loop 43 so that the speed (or frequency) $f_s$ becomes equal to an integral multiple of the reciprocal of a recirculation period of the optical loop 43, and an optical modulator (or nonlinear optical medium) 50 for mode-locking the laser oscillation according to the signal light. The active ring laser 44 may further include an optical bandpass filter 45 having a pass band including the wavelength $\lambda_p$ of the laser oscillation.

With this configuration, the laser oscillation of the active ring laser 44 is mode-locked, so that clock pulses having the wavelength $\lambda_p$ and the frequency $f_s$ are generated and output from the output port 40. Accordingly, clock pulses can be obtained without the need for opto/electric conversion, and it is possible to provide an all-optical clock regenerator insensitive to the speed and pulse shape of signal light.

The optical modulator 50 may be provided by an electro/optic modulator such as a $LiNbO_3$ intensity modulator and an EA (electroabsorption) modulator. Alternatively, a modulation method using second-order or third-order nonlinear optical effects or cross gain modulation may be adopted. For example, in the case of using four-wave mixing in an optical fiber, the wavelength $\lambda_s$ of signal light is set to a wavelength near the zero-dispersion wavelength of the fiber to effectively amplitude-modulate continuously oscillated light, thereby generating clock pulses. In the case of using a semiconductor optical amplifier (SOA), signal light can be used as pump light. In the case of using four-wave mixing in a DFB-LD in its oscillating state, the wavelength of signal light is set to a wavelength different from the wavelength of oscillated light in the DFB-LD, and this signal light is input with a relatively high power to induce gain saturation, thereby modulating the efficiency of four-wave mixing. Further, the continuously oscillated light can be effectively amplitude-modulated by a cross gain modulation (XGM)

effect. This effect of XGM is exhibited also in the case of using four-wave mixing in an SOA, so that XGM may be positively used.

Also in the case of using second-order nonlinear optical effects, substantially the same effect can be obtained by using signal light as pump light. On the other hand, in the case of using cross phase modulation (XPM), amplitude modulation can be generated by using polarization fluctuations due to phase modulation, for example.

The waveform shaper 26 is provided to suppress the jitter of optical pulses. For understanding of its operating principle, there will now be examined a case where such waveform shaping is not performed. Since the signal light is temporally disordered, it includes a portion synchronized with the clock pulses and a portion slightly shifted from the clock pulses in the optical AND gate 30. For example, in the case of using a high-speed optical switch such as a NOLM (nonlinear optical loop mirror) as the optical AND gate 30, the amplitude of the resultant converted light is not constant because of the above temporal shift. Accordingly, if the cause of the temporal shift is a noisy one such as jitter, amplitude noise is added to the converted light.

To avoid the addition of such noise, the pulse shapes of the signal light to be input into the optical AND gate 30 are made rectangular in this preferred embodiment. Accordingly, the optical AND operation between the signal light and the clock pulses can be always effected within the width of each rectangular pulse, so that the addition of amplitude noise as mentioned above can be suppressed to thereby reduce the noise such as jitter.

Figure 7:
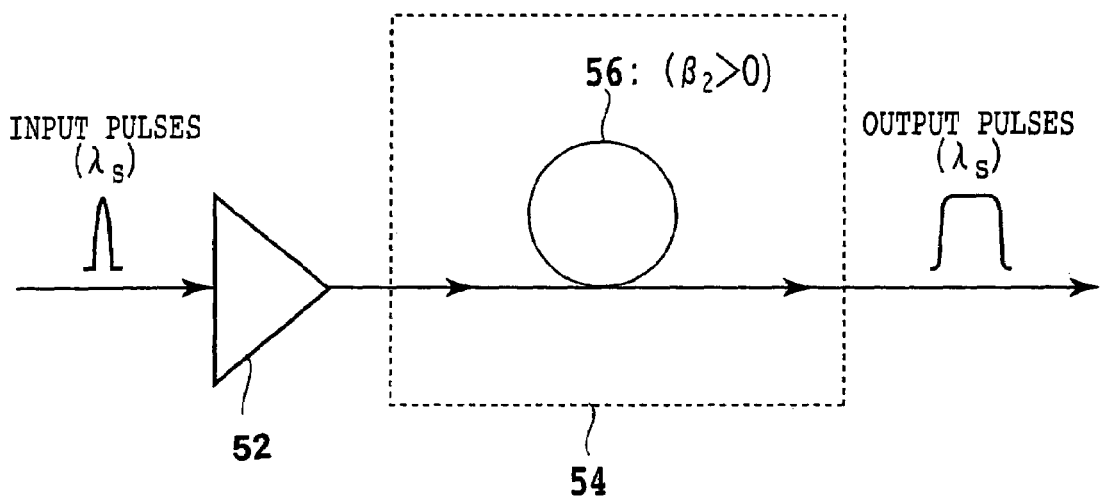
FIG. 7 is a block diagram showing a preferred embodiment of a waveform shaper applicable to the present invention.

FIG. 7 is a block diagram showing a preferred embodiment of the waveform shaper 26 shown in FIG. 5. An optical fiber 56 is used as an optical waveguide structure 54 for providing nonlinear optical effects. The GVD (group velocity dispersion) of the optical fiber 56 is $\beta_2$, and the optical fiber 56 gives normal dispersion and third-order nonlinear optical effects to signal light supplied.

An input pulse (first optical signal) having a center wavelength $\lambda_s$ is amplified by an optical amplifier 52 to obtain a power enough to generate required chirping, and next input into the optical fiber 56. In the optical fiber 56, chirping is induced by SPM (self phase modulation) to thereby broaden (diffuse) the spectrum.

In the optical fiber 56, the chirp is induced by SPM, so that the leading edge of the optical pulse shifts toward the longer wavelengths, and the trailing edge of the optical pulse shifts toward the shorter wavelengths. For example, in the case that the optical fiber 56 is a normal-dispersion fiber, the GVD increases with an increase in wavelength. Accordingly, the width of the optical pulse is increased by the above chirp. The optical pulse can be broadened rectangularly by suitably increasing the dispersion of the optical fiber so as to rapidly change the waveform in a short time and by inputting to the optical fiber a high-power optical pulse whose leading and trailing edges are as steep as possible.

In actual, the third-order nonlinear optical effects are finite and some degree of fiber length is therefore necessary. Pulse broadening due to only chromatic dispersion rather than pulse broadening due to the chirp mentioned above occurs especially at the tail of an optical pulse where the nonlinear effects are relatively small. In such a case, a dispersion compensator is preferably located at the output end of the optical fiber, so as to compensate for the broadening due to the chromatic dispersion and thereby obtain an optical pulse having a nearly desired shape. For example, by using an optical fiber having a dispersion opposite in sign to the dispersion of the normal-dispersion fiber as the dispersion compensator, the dispersion of the normal-dispersion fiber can be effectively compensated. The value of dispersion of the optical fiber and the amount of compensation by the optical fiber as the dispersion compensator may be suitably adjusted according to the conditions of the input optical pulse and the optical fiber to be used.

Additional information on the rectangular pulse generating method using a normal-dispersion fiber is described in detail in Japanese Patent Application No. 2000-34454, for example. Other methods for obtaining rectangular pulses rather than by using an optical fiber in a normal dispersion region as mentioned with reference to FIG. 7 may include a method of using a fiber grating and a method of separating optical pulses into two orthogonal polarized waves, applying temporal delay to these polarized waves, and then combining these polarized waves.

Figure 8:
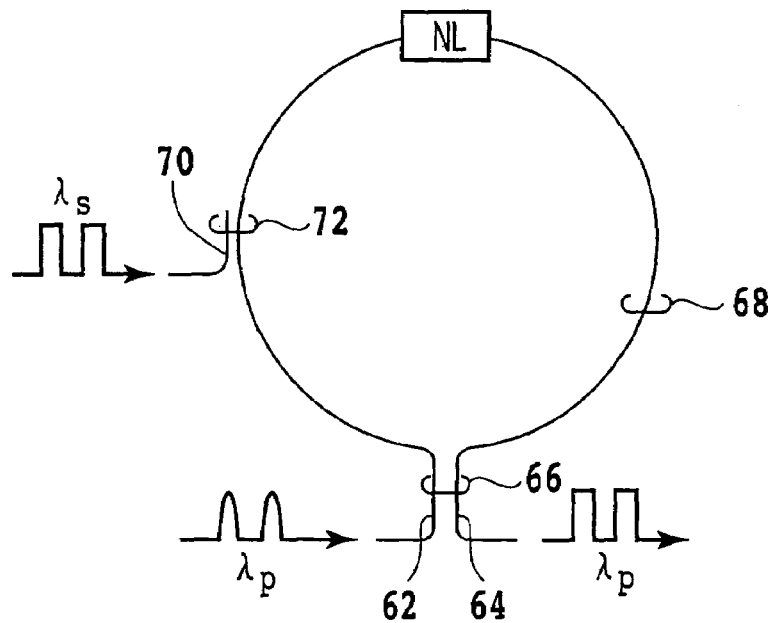
FIG. 8 is a block diagram showing a preferred embodiment of a nonlinear optical loop mirror (NOLM) applicable to the present invention.

Referring to FIG. 8, there is shown a configuration of a NOLM (nonlinear optical loop mirror) applicable to the present invention. This NOLM may be used as the optical AND gate 30 shown in FIG. 5.

This NOLM includes a first optical coupler 66 including first and second optical paths 62 and 64 directionally coupled to each other, a loop optical path 68 for connecting the first and second optical paths 62 and 64, and a second optical coupler 72 including a third optical path 70 directionally coupled to the loop optical path 68.

A part or the whole of the loop optical path 68 is provided by a nonlinear optical medium NL. The coupling ratio of the first optical coupler 66 is set substantially to 1:1.

The operation of this NOLM will now be described in brief. When probe light (clock pulses) having a wavelength $\lambda_p$ is input into the first optical path 62 of the optical coupler 66 and an optical signal having a wavelength $\lambda_s$ is input into the third optical path 70 of the optical coupler 72, a converted optical signal having a wavelength $\lambda_p$ is output from the second optical path 64 of the optical coupler 66.

The probe light is divided into two components having the same power by the optical coupler 66. The two components propagate in the loop optical path 68 clockwise and counterclockwise, respectively, with exactly the same optical path length, and are next subjected to a phase shift $\phi$ for each by the nonlinear optical medium NL. Thereafter, they are combined by the optical coupler 66. In combining these components at the optical coupler 66, they are equal in power and phase to each other, so that resultant light obtained by this combination is output from the first optical path 62 but not output from the second optical path 64 as if it is reflected by a mirror.

When an optical signal is input from the middle of the loop optical path 68 by the optical coupler 72, this optical signal propagates in the loop optical path 68 in only one direction thereof (e.g., clockwise in FIG. 8), and the nonlinear refractive index of the nonlinear optical medium NL changes for the light propagating in this direction only when on-pulses pass therethrough. Accordingly, in combining the two components of the probe light at the optical coupler 66, the phases of the two components of the probe light at their portions synchronous with off-pulses of the optical signal are coincident with each other, and the phases of the two components of the probe light at their portions synchronous with on-pulses of the optical signal are different from each other. Letting $\Delta\phi$ denote a phase difference in the latter case, an output proportional to $[1-\cos(\Delta\phi)]/2$ is obtained from the second optical path 64 of the optical coupler 66.

By setting the power of the input optical signal so that the phase difference becomes $\pi$, it is possible to perform a switching operation such that the two components combined upon passing of the on-pulses are output only from the second optical path 64. Thus, the conversion from the optical signal having the wavelength $\lambda_s$ into the converted optical signal having the wavelength $\lambda_p$ is performed. That is, wavelength conversion is performed on the data of the optical signal.

Assuming that an optical Kerr effect (cross-phase modulation (XPM) by the optical signal and the probe light) is used as the nonlinear optical effect, the phase shift $\Delta\phi$ is proportional to $\gamma PL$, where $\gamma$ is the nonlinear coefficient of the nonlinear optical medium NL, P is the optical power in the nonlinear optical medium NL, and L is the length of interaction of the optical Kerr effect in the nonlinear optical medium NL.

While the optical AND operation described above is performed in the case of different wavelengths, the preferred embodiment shown in FIG. 5 is not limited to this case.

Other examples of the optical AND gate 30 include a Mach-Zehnder interferometer type optical gate and an optical mixing type switch using four-wave mixing or difference-frequency generation. Further, an optical AND gate or O/E/O conversion device using cross phase modulation may also be used.

In this preferred embodiment, waveform shaping for increasing the pulse widths of input signal light from a transmission line (specifically, control for increasing the pulse widths in such a range that no crosstalk with an adjacent pulse occurs during one time slot or less of input signal light) is carried out on the front stage of the optical AND gate 30, thereby resolving the phase jitter occurring in obtaining AND between the input signal light pulses and the regenerated optical clock pulses in the optical AND gate 30.

The functions required for an all-optical regenerative repeater are amplitude restoration or reamplification, timing restoration or retiming, and waveform shaping or reshaping. Attention has been paid to these functions in the present invention, and it is possible to also provide an all-optical regenerative repeater in an optical communication system or a signal regenerator etc. at various node points in an optical network, by using the chirping induced by self phase modulation (SPM) to optical pulses propagating in an optical waveguide structure such as an optical fiber.

Figure 9:
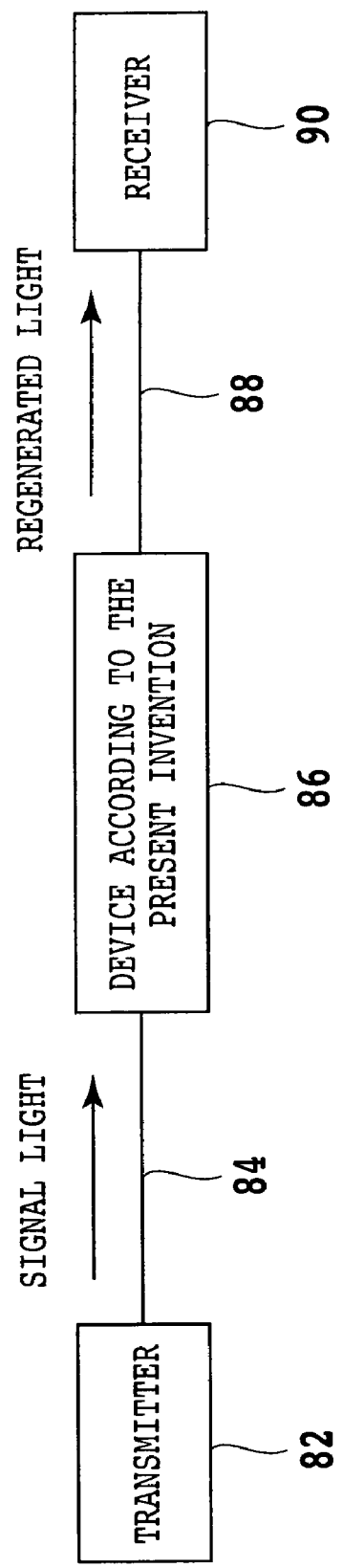
FIG. 9 is a block diagram showing a preferred embodiment of an optical fiber transmission system to which the present invention is applied.

Referring to FIG. 9, there is shown an optical fiber transmission system to which the present invention is applied. Signal light from a transmitter 82 is transmitted by a first optical fiber transmission line 84. The signal light transmitted is processed by a device 86 according to the present invention. Thereafter, resultant regenerated light is transmitted by a second optical fiber transmission line 88 and received by a receiver 90.

As the result of processing in the device 86 according to the present invention, waveform shaping or the like on the signal light can be effected. That is, the signal light degraded in quality by the transmission through the first optical fiber transmission line 84 undergoes optical 3R regeneration in the device 86 according to the present invention, thereby improving the quality and allowing the expansion of transmission processing.

Although not shown, one or more optical amplifiers may be arranged along the optical fiber transmission lines 84 and/or 88 to configure a system capable of compensating for losses.

According to the present invention as described above, it is possible to provide an optical signal processing method and device suitable for generation of SC light which can obtain a high S/N ratio and a large spectral broadening rate. Accordingly, it is possible to provide a method and system for optical signal processing for obtaining a multiwavelength light source, wavelength conversion, optical 2R and/or 3R regenerating functions, etc.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A method of processing an optical signal, comprising:
    inputting signal light into a first nonlinear optical medium to broaden a spectrum of the signal light through self phase modulation occurring in the first nonlinear optical medium, thereby obtaining first spectrally broadened light;
    compensating for chromatic dispersion effected on the first spectrally broadened light obtained in the inputting signal light, and maintaining a width of the spectrum of the signal light inputted in the compensating; and
    inputting the first spectrally broadened light processed by the compensating into a second nonlinear optical medium to broaden a spectrum of the first spectrally broadened light through self phase modulation occurring in the second nonlinear optical medium, thereby obtaining second spectrally broadened light; wherein a spectrum of the second spectrally broadened light is wider than the spectrum of the first spectrally broadened light.

2. A method according to claim 1, wherein each of the first and second nonlinear optical media comprises an optical fiber.

3. A method according to claim 2, wherein the optical fiber provides normal dispersion.

4. A method according to claim 2, wherein the compensating comprises compensating for chromatic dispersion occurring in the optical fiber.

5. A method according to claim 1, further comprising providing an optical amplifier for amplifying the signal light to be input into the first nonlinear optical medium and the second nonlinear optical medium.

6. A method according to claim 5, wherein the compensating comprises compensating for chromatic dispersion occurring in the optical amplifier.

7. A method according to claim 1, further comprising providing an optical bandpass filter for inputting the second spectrally broadened light obtained in the inputting the first spectrally broadened light.

8. A method according to claim 7, wherein the optical bandpass filter has a passband narrower than the spectral width of the second spectrally broadened light.

9. A method according to claim 8, wherein a center wavelength in the passband is different from a wavelength of the signal light, whereby the waveform of the signal light is improved.

10. A method according to claim 8, wherein the passband is narrow enough to extract an optical carrier from the second spectrally broadened light.

11. A method according to claim 8, wherein the passband is wide enough to extract a pulse train synchronous with the pulse train of the signal light from the second spectrally broadened light.

12. A method according to claim 8, wherein the passband comprises a plurality of passbands.

13. A method according to claim 1, wherein a pulse width of the second spectrally broadened light in a time axes is the same as a pulse width of the first spectrally broadened light in a time axes.

14. A device for processing an optical signal, comprising:
a first nonlinear optical medium for inputting signal light to broaden a spectrum of the signal light through self phase modulation occurring in the first nonlinear optical medium, thereby obtaining first spectrally broadened light;
a dispersion compensator for compensating for chromatic dispersion effected on the first spectrally broadened light obtained by the first nonlinear optical medium, and maintaining a width of the spectrum of the signal light inputted in the dispersion compensator; and
a second nonlinear optical medium for inputting the first spectrally broadened light processed by the dispersion compensator to broaden a spectrum of the first spectrally broadened light through self phase modulation occurring in the second nonlinear optical medium, thereby obtaining second spectrally broadened light; wherein a spectrum of the second spectrally broadened light is wider than the spectrum of the first spectrally broadened light.

15. A device according to claim 14, wherein each of the first and second nonlinear optical media comprises an optical fiber.

16. A device according to claim 15, wherein the optical fiber provides normal dispersion.

17. A device according to claim 15, wherein the dispersion compensator comprises means for compensating for chromatic dispersion occurring in the optical fiber.

18. A device according to claim 14, further comprising an optical amplifier for amplifying the signal light to be input into the first nonlinear optical medium and the second nonlinear optical medium.

19. A device according to claim 18, wherein the dispersion compensator comprises means for compensating for chromatic dispersion occurring in the optical amplifier.

20. A device according to claim 14, further comprising an optical bandpass filter for inputting the second spectrally broadened light obtained by the second nonlinear optical medium.

21. A device according to claim 20, wherein the optical bandpass filter has a passband narrower than the spectral width of the second spectrally broadened light.

22. A device according to claim 21, wherein a center wavelength in the passband is different from a wavelength of the signal light, whereby the waveform of the signal light is improved.

23. A device according to claim 21, wherein the passband is narrow enough to extract an optical carrier from the second spectrally broadened light.

24. A device according to claim 21, wherein the passband is wide enough to extract a pulse train synchronous with the pulse train of the signal light from the second spectrally broadened light.

25. A device according to claim 21, wherein the passband comprises a plurality of passbands.

26. A device according to claim 14, wherein a pulse width of the second spectrally broadened light in a time axes is the same as a pulse width of the first spectrally broadened light in a time axes.

27. A system comprising:
an optical coupler for splitting signal light into first and second signal lights;
an optical clock regenerator for generating clock pulses according to the first signal light;
an optical AND circuit for inputting the clock pulses and the second signal light to output converted signal light obtained by synchronization of the clock pulses and the second signal light; and
an optical signal processing device for inputting the converted signal light output from the optical AND circuit;
the optical signal processing device comprising:
a first nonlinear optical medium for inputting the converted signal light to broaden a spectrum of the converted signal light through self phase modulation occurring in the first nonlinear optical medium, thereby obtaining first spectrally broadened light;
a dispersion compensator for compensating for chromatic dispersion effected on the first spectrally broadened light obtained by the first nonlinear optical medium, and maintaining a width of the spectrum of the signal light inputted in the dispersion compensator;
a second nonlinear optical medium for inputting the first spectrally broadened light processed by the dispersion compensator to broaden a spectrum of the first spectrally broadened light through self phase modulation occurring in the second nonlinear optical medium, thereby obtaining second spectrally broadened light; and
an optical bandpass filter for inputting the second spectrally broadened light, having a passband whose center wavelength is different from a center wavelength of the second spectrally broadened light, thereby obtaining a signal component of the inputted light; wherein a spectrum of the second spectrally broadened light is wider than the spectrum of the first spectrally broadened light.

28. A system according to claim 27, further comprising a waveform shaper for increasing the pulse width of the second signal light.

29. A system comprising:
a first optical fiber transmission line for transmitting signal light;
an optical signal processing device for inputting the signal light transmitted by the first optical fiber transmission line; and
a second optical fiber transmission line for transmitting regenerated light output from the optical signal processing device;
the optical signal processing device comprising:
a first nonlinear optical medium for inputting the signal light to broaden a spectrum of the signal light through self phase modulation occurring in the first nonlinear optical medium, thereby obtaining first spectrally broadened light;
a dispersion compensator for compensating for chromatic dispersion effected on the first spectrally broadened light obtained by the first nonlinear optical medium, and maintaining a width of the spectrum of the signal light inputted in the dispersion compensator;
a second nonlinear optical medium for inputting the first spectrally broadened light processed by the dispersion compensator to broaden a spectrum of the first spectrally broadened light through self phase modulation occurring in the second nonlinear optical medium, thereby obtaining second spectrally broadened light; and
an optical bandpass filter for inputting the second spectrally broadened light, having a passband whose center wavelength is different from a center wavelength of the second spectrally broadened light, thereby obtaining a signal component of the inputted light; wherein a spectrum of the second spectrally broadened light is wider than the spectrum of the first spectrally broadened light.

* * * * *

UNITED STATES PATENT AND TRADEMARK OFFICE
CERTIFICATE OF CORRECTION

PATENT NO. : 7,280,766 B2  Page 1 of 1
APPLICATION NO. : 10/602623
DATED : October 9, 2007
INVENTOR(S) : Shigeki Watanabe It is certified that error appears in the above-identified patent and that said Letters Patent is hereby corrected as shown below:

Title Page, Item (56) (Other Publications), Line 6, change "mid-spand" to --mid-span--.

Signed and Sealed this

Fifteenth Day of April, 2008

JON W. DUDAS
*Director of the United States Patent and Trademark Office*